US012671966B2

(12) United States Patent
Lindquist et al.

(10) Patent No.: US 12,671,966 B2
(45) Date of Patent: Jun. 30, 2026

(54) METHOD FOR CREATING A MODEL FOR POSITIONING, AND A METHOD FOR POSITIONING

(71) Applicant: Combain Mobile AB, Lund (SE)

(72) Inventors: Björn Lindquist, Bjärred (SE); Karl Åström, Lund (SE); Christoffer Kjellson, Lund (SE)

(73) Assignee: Combain Mobile AB, Lund (SE)

( * ) Notice: Subject to any disclaimer, the term of this patent is extended or adjusted under 35 U.S.C. 154(b) by 740 days.

(21) Appl. No.: 17/897,715

(22) Filed: Aug. 29, 2022

(65) Prior Publication Data

US 2023/0075165 A1 Mar. 9, 2023

(30) Foreign Application Priority Data

Aug. 31, 2021 (EP) .................................... 21194001

(51) Int. Cl.
*H04W 4/33* (2018.01)
*G06F 18/214* (2023.01)
(Continued)

(52) U.S. Cl.
CPC ............ *H04W 4/33* (2018.02); *G06F 18/214* (2023.01); *G06N 20/00* (2019.01); *H04W 4/029* (2018.02)

(58) Field of Classification Search
CPC ....... H04W 4/00–029; H04W 4/30–48; G06N 20/00; G06F 18/214
See application file for complete search history.

(56) References Cited

U.S. PATENT DOCUMENTS 7,397,424 B2 7/2008 Houri
8,369,264 B2 2/2013 Brachet et al.
(Continued)

FOREIGN PATENT DOCUMENTS

EP 3093683 A1 11/2016

OTHER PUBLICATIONS

Alberto Belmonte-Hernandez et al., "Recurrent Model for Wireless Indoor Tracking and Positioning Recovering Using Generative Networks," IEEE Sensors Journal, 2020, 10 pgs, Best Available Date: Dec. 6, 2019.

(Continued)

*Primary Examiner* — San Htun
(74) *Attorney, Agent, or Firm* — SankerIP

(57) ABSTRACT

A method for creating a model for positioning includes receiving a training dataset including samples of an estimation labeled type. Each sample of the estimation labeled type being associated with a measurement position. Each sample of the estimation labeled type includes sensor data measured at the measurement position associated with the sample. The sensor data being characteristic of the measurement position associated with the sample. Each sample includes an estimated measurement position being an estimate of the measurement position associated with the sample. Each sample includes an estimated accuracy being an estimate of an accuracy of the estimated measurement position. The method including training a machine learning model to convert sensor data to a position. The training is based on the samples of the estimation labeled type in the training dataset, whereby the model for positioning is created.

11 Claims, 8 Drawing Sheets

(51) Int. Cl.
   G06N 20/00        (2019.01)
   H04W 4/029        (2018.01)

(56)                References Cited

U.S. PATENT DOCUMENTS

| | | | |
|---|---|---|---|
| 8,983,493 | B2 | 3/2015 | Brachet et al. |
| 10,671,921 | B1 | 6/2020 | Karon et al. |
| 11,032,665 | B1 | 6/2021 | George et al. |
| 2014/0342755 | A1 | 11/2014 | Youssef et al. |
| 2019/0362237 | A1 | 11/2019 | Choi et al. |
| 2019/0373413 | A1* | 12/2019 | Kong ...................... H04W 4/33 |
| 2022/0292388 | A1* | 9/2022 | Elangovan ......... G07C 9/00309 |
| 2022/0369070 | A1* | 11/2022 | Feki ...................... H04W 24/02 |
| 2022/0394101 | A1* | 12/2022 | Feinmesser ........... H04L 67/535 |

OTHER PUBLICATIONS

Alexander A. Golovan et al., "Efficient Localization Using Different Mean Offset Models in Gaussian Processes," 2014 International Conference on Indoor Positioning and Indoor Navigation (IPIN), 2014, 10 pgs, Oct. 27-30, 2014.
Amir Beck et al., "Exact and Approximate Solutions of Source Localization Problems," IEEE Transactions on Signal Processing, vol. 56, No. 5, May 2008, 9 pgs.
Combain Mobile AB, Extended European Search Report, EP 21194001. 0, Apr. 22, 2022, 9 pgs.
Changhao Chen et al., "Deep Neural Network Based Inertial Odometry Using Low-Cost Inertial Measurement Units," IEEE Transactions on Mobile Computing, 2021, 14 pgs, Best Available Date: Dec. 19, 2019.
Chao Xiao et al., "3-D BLE Indoor Localization Based on Denoising Autoencoder," IEEE Access, 2017, 10 pgs.
Christopher M. Bishop, "Pattern Recognition and Machine Learning (Information Science and Statistics)," Springer, Berlin, Heidelberg, 2006, 758 pgs, Aug. 17, 2006.
David Russell Luke et al., "A Simple Globally Convergent Algorithm for the Nonsmooth Nonconvex Single Source Localization Problem," Journal of Global Optimization, Jan. 25, 2017, 25 pgs.
Diederik P. Kingma et al., "Semi-supervised Learning with Deep Generative Models," 2014, 9 pgs.
Gough Lui et al., "Differences in RSSI Readings Made by Different Wi-Fi Chipsets: A Limitation of WLAN Localization," 2011 International Conference on Jun. 2011 Localization and GNSS (ICL-GNSS), 2011, 6 pgs, Jun. 2011.
Hamada Rizk et al., "Effectiveness of Data Augmentation in Cellular Based Localization Using Deep Learning," 2019 IEEE Wireless Communications and Networking Conference (WCNC), 2019, 6 pgs, Apr. 15-18, 2019.
Harold Wayne Sorenson, "Least-squares Estimation: From Gauss to Kalman," IEEE Spectrum, 1970, 6 pgs.
Hengyi Gan et al., "A Hybrid Model Based on Constraint OSELM, Adaptive Weighted SRC and KNN for Large-Scale Indoor Localization," IEEE Access, 2019, 19 pgs, Best Available Date: Dec. 28, 2018.
Hyoin Bae et al., "Low-Cost Indoor Positioning System using BLE (Bluetooth Low Energy) based Sensor Fusion with Constrained Extended Kalman Filter" 2016, IEEE International Conference on Robotics and Biomimetics (ROBIO), 2016, 7 pgs, Dec. 3-7, 2016.
Ian Goodfellow et al., "Deep Learning," MIT Press, 2016, 798 pgs. Retrieved from the Internet: http://www.deeplearningbook.org.

Joaquin Torres-Sospedra et al., "UJIIndoorLoc: A New Multi-building and Multi-floor Database for WLAN Fingerprint-based Indoor Localization Problems," In 2014 International Conference on Indoor Positioning and Indoor Navigation (IPIN), 2014, 10 pgs, Best Available Date: Oct. 27-30, 2014.
Kenneth Batstone et al., "Robust Time-of-Arrival Self Calibration and Indoor Localization using Wi-Fi Round-Trip Time Measurements," 2016 IEEE International Conference on Communications Workshops (ICC), IEEE, 2016, 6 pgs, May 23-27, 2016.
Kevin P. Murphy, "Machine Learning: A Probabilistic Perspective," MIT Press, Cambridge, 2013, 1098 pgs, Aug. 24, 2012 on amazon.
Kyeong Soo Kim et al., "A Scalable Deep Neural Network Architecture for Multi-Building and Multi-Floor Indoor Localization Based on Wi-Fi Fingerprinting," Big Data Analytics, Apr. 2018, 17 pgs.
Martin Larsson et al., "Optimal Trilateration is an Eigenvalue Problem," IEEE International Conference on Acoustics, Speech and Signal Processing (ICASSP), 2019, 5 pgs, Best Available Date: May 12-17, 2019.
Meng Sun et al., "Indoor Positioning Tightly Coupled Wi-Fi FTM Ranging and PDR Based on the Extended Kalman Filter for Smartphones," IEEE Access, vol. 8, Mar. 9, 2020, 14 pgs.
Minh Tu Hoang et al., "Recurrent Neural Networks for Accurate RSSI Indoor Localization," Oct. 22, 2019, 13 pgs, Sep. 10, 2019.
Moustafa Abbas et al., "WiDeep: WiFi-based Accurate and Robust Indoor Localization System using Deep Learning," 2019 IEEE International Conference on Pervasive Computing and Communications (PerCom), 2019, 10 pgs, Mar. 11-15, 2019.
Pascal Vincent et al., "Stacked Denoising Autoencoders: Learning Useful Representations in A Deep Network with A Local Denoising Criterion," Journal of Machine Learning Research, 2010, 38 pgs.
Peter J. G. Teunissen et al., Least-Squares Variance Component Estimation, Journal of Geodesy, 2007, 18 pgs.
Rainer Mautz, "Overview of Current Indoor Positioning Systems," Geodesy and Cartography, 2012, 6 pgs, Best Available Date: 2008.
Sheng-Cheng Yeh et al., "Study on an Indoor Positioning System Using Earth's Magnetic Field," IEEE Transactions on Instrumentation and Measurement, 2020, 8 pgs, Best Available Date: Mar. 2020.
Shixiong Xia et al., "Indoor Fingerprint Positioning Based on Wi-Fi: An Overview," ISPRS International Journal of Geo-Information, 2017, 25 pgs.
Sukhoon Jung et al., "Wi-Fi Fingerprint-based Approaches Following Log-Distance Path Loss Model for Indoor Positioning," 2011 IEEE MTT-S International Microwave Workshop Series on Intelligent Radio for Future Personal Terminals, 2011, 2 pgs, Best Available Date: Aug. 24-25, 2011.
Trevor Hastie et al., "The Elements of Statistical Learning: Data Mining, Inference, and Prediction," Springer, New York, 2009, 762 pgs, Feb. 2009.
Wafa Njima et al., "Smart Probabilistic Approach with RSSI Fingerprinting for Sep. 2017 Indoor Localization," 2017 25th International Conference on Software, Telecommunications and Computer Networks (SoftCOM), 2017, 6 pgs, Sep. 2017.
Xudong Song et al., "A Novel Convolutional Neural Network Based Indoor Localization Framework with WiFi Fingerprinting," IEEE Access, Aug. 8, 2019, 12 pgs.
Zixiang Ma et al., "A BLE RSSI Ranking based Indoor Positioning System for Generic Smartphones," 2017 Wireless Telecommunications Symposium (WTS), 2017, pp. 1-8, Best Available Date: Apr. 26-28, 2017.

\* cited by examiner

100

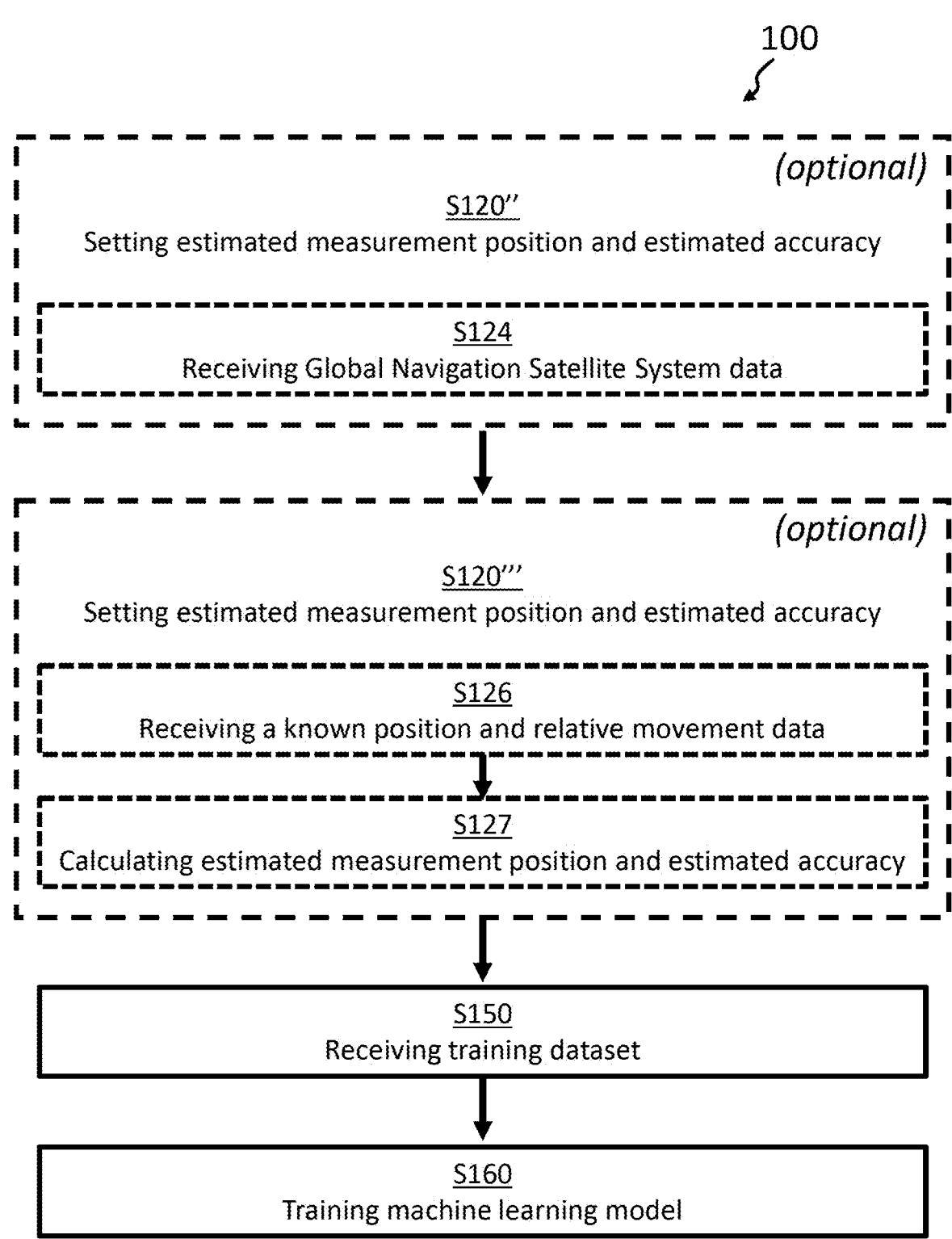

*(optional)*

S120''
Setting estimated measurement position and estimated accuracy

S124
Receiving Global Navigation Satellite System data

*(optional)*

S120'''
Setting estimated measurement position and estimated accuracy

S126
Receiving a known position and relative movement data

S127
Calculating estimated measurement position and estimated accuracy

S150
Receiving training dataset

S160
Training machine learning model

S130
Receiving candidate training dataset          (optional)

S132
Selecting samples          (optional)

S134
Comparing estimated accuracy          (optional)

S136
Rejecting 136 samples          (optional)

S140
Augmenting          (optional)

S148
Including augmented sample          (optional)

S150
Receiving training dataset

S160
Training machine learning model

200

S202
Acquiring sensor data

S204
Accessing model

S206
Determining first estimate

S208
Determining estimated relative positions

S212
Improving first estimates

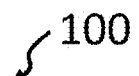
100
12
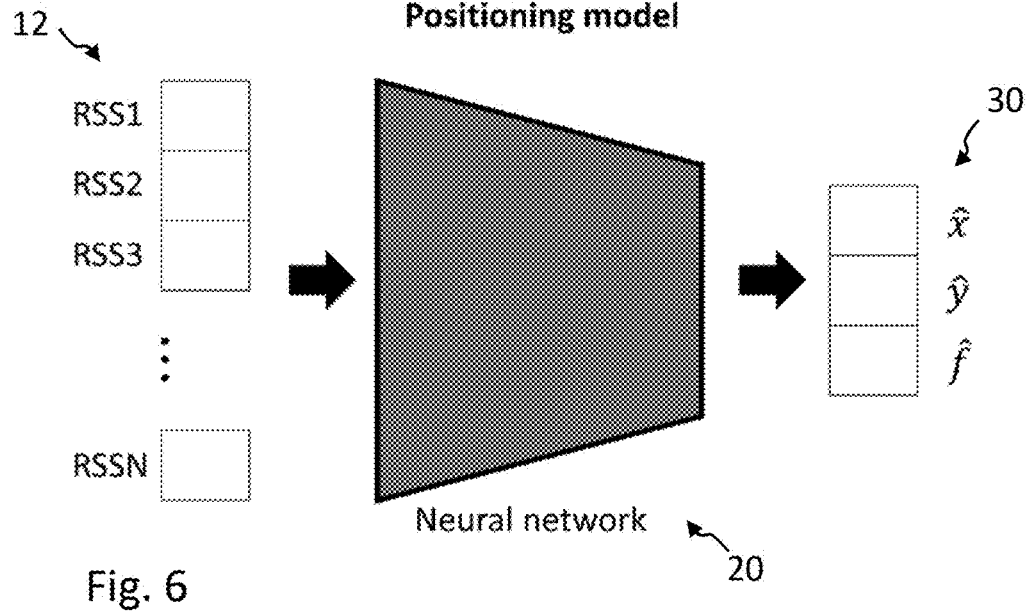
Positioning model
RSS1
RSS2
RSS3
RSSN
30
$\hat{x}$
$\hat{y}$
$\hat{f}$
Neural network
20
Fig. 6
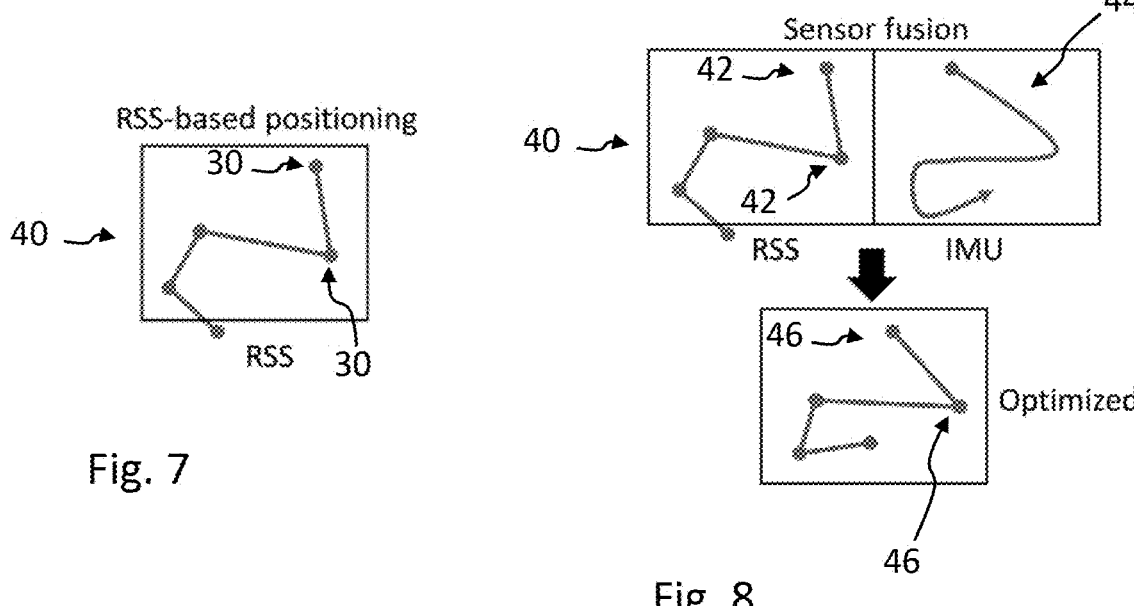
RSS-based positioning
30
40
RSS
30
Fig. 7
Sensor fusion
44
42
42
40
RSS
IMU
46
Optimized
46
Fig. 8

METHOD FOR CREATING A MODEL FOR POSITIONING, AND A METHOD FOR POSITIONING

TECHNICAL FIELD

The present inventive concept relates, in general, to a method for creating a model for positioning and a method for positioning. More particularly, the present inventive concept relates to a machine learning model based localization system using multi-sensor data and, using training data with measured position and estimated position accuracy to create a model for localizing devices in an indoor environment.

BACKGROUND

A positioning system enables a mobile device to determine its position. A positioning system may further make the position of the device available for position-based services such as navigating, tracking or monitoring, etc. Global Navigation Satellite Systems (GNSS), such as GPS, are the most widely used positioning systems. For small and low-cost battery-operated electronic devices, GPS may be expensive and draw too much power. GPS may also be hard to deploy for indoor use as line-of-sight transmission between receiver and satellite may be hard to achieve indoors.

There are a number of alternative positioning technologies for indoor positioning systems (IPS) such as infrared (IR), ultrasound, radio-frequency identification (RFID), wireless local environment network (WLAN or Wi-Fi), Bluetooth, sensor networks, ultra-wideband (UWB), magnetic signals, visible light, vision analysis and audible sound.

One localization technique used for positioning with wireless access points (APs) and Bluetooth beacons is called fingerprinting and is based on an offline learning training phase of measuring the intensity of the received signal strength (RSS) in different defined positions and recording the "fingerprint" of RSS signals at that position in a database. When data is gathered in all positions, a device can look-up its position by recording the RSS "fingerprint" and compare it to the most similar fingerprints in the database. One way of doing this is the k-nearest neighbor (kNN) algorithm.

Although existing indoor positioning systems have many advantages, there are still improvements to be made.

SUMMARY

It is an objective of the present inventive concept to enable accurate positioning of devices. It is a further objective of the present inventive concept to enable cost-effective positioning of devices. It is a further objective of the present inventive concept to make the positioning and/or the creation of a model for positioning computationally efficient and thereby also power efficient and cost efficient. It is further an objective to enable automated creation of indoor positioning. Automated creation of indoor positioning may facilitate the creation of a global indoor positioning service. These and other objectives of the inventive concept are at least partly met by the invention as defined in the independent claims. Preferred embodiments are set out in the dependent claims.

The methods discussed herein facilitate accurate indoor localization globally and may be used for positioning of both advanced devices like smartphones and simple wireless Internet of Things devices. Thus, the methods may use existing infrastructure in the buildings (Wi-Fi APs, Bluetooth beacons) and be able to position low-cost wireless devices (Wi-Fi receivers, Bluetooth receivers) with no extra hardware added.

According to a first aspect, there is provided a method for creating a model for positioning within an environment, the method comprising:

receiving a training dataset comprising samples of an estimation labeled type, each sample of the estimation labeled type being associated with a measurement position in the environment, each sample of the estimation labeled type comprising sensor data, measured at the measurement position associated with the sample, the sensor data being characteristic of the measurement position associated with the sample;

an estimated measurement position, being an estimate of the measurement position associated with the sample;

an estimated accuracy, being an estimate of an accuracy of the estimated measurement position;

training a machine learning model to convert sensor data to a position in the environment, wherein the training is based on the samples of the estimation labeled type in the training dataset, whereby the model for positioning within the environment is created.

The machine learning model may be any kind of model created through training using a training dataset. The machine learning model may be an artificial neural network. In the following, the machine learning model will predominantly be described as an artificial neural network (for convenience simply called neural network). As an alternative, the machine learning model may be e.g. a decision tree, a model based on decision trees such as a random forest, a support vector machine, or a Bayesian network.

It should be understood that the environment for the positioning may be a building. Further, the estimated measurement position may include a height or a floor indicator. The method may be particularly advantageous for creating a model for indoor positioning as GPS works poorly or not at all inside buildings. Further, when the estimated measurement position includes a height or a floor indicator, positioning in multi-story buildings is enabled. The text mainly focuses on indoor positioning, but it is to be understood that the methods also work for outdoor positioning, e.g. outdoor positioning of devices that do not use GPS or similar techniques.

The sensor data of at least one sample may comprise distance dependent data, the distance dependent data comprising an indication of a distance between the measurement position associated with the at least one sample and a radio transmitter.

An indication of a distance may not necessarily be a direct measure of a distance. Rather, the indication of a distance may be a quantity that is dependent on distance in some way. The measured quantity need not even be directly proportional to the distance and may even be non-linearly related to the distance. As further described below, the distance measurement may be based on a received signal strength, e.g. a received power of a signal, or be based on a time of travel of a signal between a source and a receiving unit. Also, the distance dependent data may be represented in a non-linear scale, such as a logarithmic scale.

The sensor data may comprise received signal strength (RSS) data from one or more radio transmitters in the environment.

The sensor data of a sample may comprise RSS data which indicates a distance between the measurement position associated with the sample and a radio transmitter. The measured signal strength of a radio transmitter may decay with increasing distance from the radio transmitter, e.g. decay exponentially. Thus, the distance between the radio transmitter and the measurement position where the RSS data was measured may be calculated from the received signal strength and the equation for the expected exponential decay. In order to exemplify the inventive concept, the training data set will mainly be described as a data set wherein each sample comprises sensor data in the form of RSS data. However, it should be understood that any one of the samples of the training data set may additionally, or alternatively, comprise other sensor data.

It is a realization that estimated measurement positions may be used to create a model for positioning within an environment. It may not be necessary to create the model based only on known measurement positions. A model based on estimated measurement positions may still be accurate. A model based on estimated measurement positions may in fact be more accurate than a model based only on known measurement positions, at least under some circumstances. Estimated measurement positions may be more readily available than known measurement positions. Thus, basing the model on estimated measurement positions may mean that more data samples can be used. For example, through crowdsourcing a large number of samples comprising sensor data and estimated measurement positions may become available. Although the measurement data in such samples may not be trusted fully, and as such be considered as estimated measurement positions, the sheer number of data samples becoming available may make the model accurate.

If one treats estimated measurement positions the same way as one would treat known measurement positions when creating the model, errors may be introduced in the model. The negative impact on the model from said errors may outweigh the positive impact of more samples being available. An important realization is thus that an estimate of an accuracy of the estimated measurement position, i.e. an estimated accuracy, may be used to mitigate the negative impact on the model from said errors.

Specifically, the use of an estimated accuracy may allow various types of positioning sources to be utilized instead of just manually created training data which by design may have a very high accuracy of the position but may be expensive to acquire. For example, GPS data with lower accuracy or other indoor positioning methods like inertial navigation or bundling optimization as outlined in patent EP3093683, may be used to determine estimated measurement positions.

It is a realization that a model for positioning within an environment may advantageously be created through the training of a machine learning model such as e.g. a neural network. A model created through the training of a neural network may be accurate as a neural network may find data relationships that are overlooked by humans. Creating a model through the training of a neural network may be cost-effective as little manual fine tuning of the model may be required. It is a further realization that rethinking conventional teachings of what a neural network training dataset should comprise facilitates further improvements in accuracy and cost efficiency.

To illustrate some of the advantages of the inventive concept, a way of creating a model using conventional teachings of neural networks will first be described in what we may label as "an example in line with conventional teachings". It should be noted that said example is given without conceding that the example in itself is part of prior art. Then, an example of a method according to the inventive concept will be described.

As an example in line with conventional teachings consider trying to create a model for positioning within a building, wherein the model is to be used for positioning of mobile phones within the building. As previously described, GPS signals may not be readily available within the building, e.g. only close to windows etc. Instead, Wi-Fi access points (APs) in the form of Wi-Fi radio transmitters may be readily available in buildings and may be used. A dataset of samples may be collected wherein each sample corresponds to a measurement position in the building and each sample comprises sensor data in the form of RSS data, such as one or more RSS signals, and the known measurement position. A neural network may then be trained to convert RSS data to a position in the building. The neural network may thus, through the training dataset, "learn" the relationship between RSS data and measurement positions. In such training the dataset may, in line with conventional teachings, be used with the RSS data as features and the known positions as labels, the dataset may thus be considered to comprise samples of a labeled type. During conventional neural network training the validity and/or quality of a sample is generally not questioned and the labels are taken as ground truth. Therefore, great care may need to be taken in forming the training dataset. Training in line with conventional teachings may thus require rather large efforts in gathering the samples. In principle it may be necessary to manually create the dataset, e.g. by physically going to the building and systematically recording the RSS data at various known positions inside the building.

As an example of a method according to the inventive concept, a model for positioning within a building may be created using other data than systematically manually created data. For example, crowdsourced data may be used to create the training dataset. People may walk through the building back and forth every day and their mobile phones may be able to record RSS data at various positions and create vast amounts of data. Such data may be used to create the model for positioning. However, even though each piece of RSS data is associated with a measurement position, said measurement position may not be known, as the GPS of the mobile phone may not work, or work poorly, in the building. Thus, according to conventional teachings it may be hard, or impossible, to create an accurate model by training a neural network on such data.

Different ways of estimating the measurement position will be described below. As previously discussed, if these estimates are presented as ground truth to the neural network, e.g. if each sample of the training dataset would comprise only sensor data and an estimated measurement position (but not including an estimated accuracy), they may do more harm than good. In contrast, when samples of the training dataset comprise sensor data, an estimated measurement position, as well as an estimated accuracy, it enables the training of the neural network to give a higher weight to more accurate measurement positions and still use low accuracy measurement positions to contribute to a better overall positioning.

The sensor data is characteristic of the measurement position associated with the sample. Such sensor data may be any kind of sensor data that changes with the measurement position. The sensor data may be characteristic of the measurement position by indicating that the measurement position belongs to a subset of measurement positions within the environment. For example, the sensor data may be characteristic of the measurement position by indicating that the measurement position is at a certain distance from a radio transmitter. In this example all measurement positions at said distance from the radio transmitter may be seen as belonging to the subset of measurement positions. The sensor data may, as previously mentioned, comprise distance dependent data and/or RSS data. But sensor data could, alternatively or additionally, be any other sensor data that changes with position. In one example, sensor data may comprise distance dependent measurements like round trip time, RTT, to WiFi APs. RTT may be the time it takes for a network request to go from a device to a WiFi AP and back again. In another example, sensor data may comprise UWB distance measurements to UWB beacons. In another example, sensor data may comprise light sensor data, e.g. light sensor data of a modulated light fingerprint. Light, e.g. invisible light, may be modulated in different ways in different locations of a building and thereby form a fingerprint of the location. Similarly, sensor data may comprise audio data. Sound, e.g. sound not perceivable by humans, may be modulated in different ways in different locations of a building and thereby form a fingerprint of the location. Sensor data may, additionally or alternatively, comprise data from pressure sensors which indicates height.

It should also be clear that sensor data does not necessarily have to be an absolute value. Sensor data could be a relative value measurement, for example pressure difference compared to walking into a building, RSS difference measured relative to strongest RSS value measured at the location, and so on.

Sensor data may comprise one or more entities of data. For example, sensor data may comprise one RSS measurement to one single radio transmitter. In another example, sensor data may comprise a plurality of RSS measurements, wherein each RSS measurement corresponds to a separate radio transmitter. Such a plurality of RSS measurements may be seen as a fingerprint of a location.

Sensor data may comprise one type of sensor data, e.g. only RSS data, or any combination of types of sensor data, e.g. a combination of RSS data and RTT data, or a combination of RSS data, light sensor data, and audio data. Just like combinations of several entities of sensor data, sensor data of the same type may be seen as a fingerprint of a location, combinations of sensor data of different types may be seen as a fingerprint of a location.

The estimated measurement position may be a 2D estimated measurement position, e.g. comprising latitude and longitude, or comprising a x value and a y value corresponding to coordinates in a 2D coordinate system.

Alternatively, the estimated measurement position may be a 3D estimated measurement position, e.g. comprising latitude, longitude, and altitude, or comprising a x value, a y value, and a z value corresponding to coordinates in a 3D coordinate system. The altitude or z value may be meters above ground level, meters above sea level, or the floor of a building, e.g. ground floor, first floor etc.

The estimated accuracy is an estimate of an accuracy of the estimated measurement position. The estimated accuracy may be a single figure like the average horizontal accuracy figure in meters or a figure like horizontal dilution of precision (HDOP) for GPS receivers or an accuracy in three dimensions, x, y and z. As an example, in a bundle optimization positioning algorithm, variance in x and y respectively and an estimated floor accuracy may be obtained. The estimated accuracy may be represented in many ways, e.g. as the inverse of a standard deviation, as the inverse of a variance, or as an inverse of a covariance matrix. Alternatively, the estimated accuracy may be represented as one or more standard deviations or as a variance. There are a number of different ways for different indoor positioning systems to calculate the estimated accuracy or estimated error of a positioning estimate, and all of these can be used in the scope of this patent.

Setting Estimated Measurement Position and Estimated Accuracy of a Sample

The method may comprise setting the estimated measurement position and the estimated accuracy of each of a plurality of samples of the estimation labeled type in the training dataset. This may be done in many different ways as there are many different indoor positioning systems (IPS), some of which are described below.

Setting the estimated measurement position and the estimated accuracy of each of a sample of the estimation labeled type in the training dataset may be done by:

receiving a model of estimated radio transmitter positions in the environment;

calculating the estimated measurement position and the estimated accuracy to be set for said sample of the estimation labeled type based on distance dependent measurements to the transmitters and the model of estimated radio transmitter positions.

For example, if a number of distance dependent measurements, such as RSS measurements have been collected at a measurement position, e.g. by a mobile phone contributing in a crowdsourcing scheme, the measurement position may be estimated by a trilateration calculations if estimates of the radio transmitter positions are available from a model of estimated radio transmitter positions.

It is herein important to note that the radio transmitter positions may not be fully known themselves but indeed be estimates of the radio transmitter positions. An estimate of the accuracy of the estimated measurement position, i.e. the estimated accuracy, may then be calculated using the accuracy of the estimated radio transmitter positions. The RSS measurements, the calculated estimated measurement position and the calculated estimated accuracy may then together form a sample for the training dataset.

It should also be noted that even if the model of estimated radio transmitter positions does not explicitly comprise accuracies for the estimated radio transmitter positions an estimated accuracy of the measurement position may still be calculated. For example, in 2D three distance dependent measurements should through triangulation intersect in one point, the estimated measurement position. However, due to inaccuracies in the estimated radio transmitter positions and/or the modelling of the indoor environment (walls etc.), they may intersect to form an area. Such an area may also be an estimate of the accuracy of the estimated measurement position.

The distance dependent measurements to the transmitters that are used to calculate the estimated measurement position may be e.g. RSS measurements, RTT measurements to WiFi APs, UWB distance measurements to UWB anchors, etc.

As described above, the distance dependent measurements to the transmitters that are used to calculate the estimated measurement position of the sample may also be used as the sensor data of the sample. Alternatively, or additionally, other types of sensor data may form the sensor data of the sample. To exemplify:

A sample may comprise RSS data and an estimated measurement position and estimated accuracy calculated from said RSS data. A neural network trained on such samples may create a model for positioning using RSS data.

Alternatively, a sample may comprise light sensor data and an estimated measurement position and estimated accuracy calculated from RSS data measured at the same measurement position as the light sensor data. A neural network trained on such samples may create a model for positioning using light sensor data. A simple device which can only orient itself using light sensor data may then benefit from a model which has been created from data acquired by more advanced devices which can measure both light sensor data and RSS data.

Alternatively, a sample may comprise light sensor data and RSS data acquired at the same measurement position, and an estimated measurement position and estimated accuracy calculated from RSS data and/or the light sensor data.

Generating the model of estimated radio transmitter positions may be done by:

receiving radio transmitter modelling samples, each radio transmitter modelling sample being associated with a measurement position in the environment or in the vicinity of the environment, each radio transmitter modelling sample comprising:

distance dependent data, measured at the measurement position associated with the radio transmitter modelling sample, the distance dependent data comprising an indication of a distance between the measurement position of the radio transmitter modelling sample and a radio transmitter;

forming a candidate model of estimated radio transmitter positions and estimated measurement positions of the radio transmitter modelling samples based on the received radio transmitter modelling samples and a plurality of defined positions for samples and/or for radio transmitters;

iteratively reducing a sum of residuals for said candidate model, wherein at least one residual is based on, for at least one sample of the received radio transmitter modelling samples, a difference between an estimated distance between the measurement position of said at least one sample and a radio transmitter as represented by the model and a measured distance between the measurement position of said at least one sample and the radio transmitter as represented by the distance dependent data of said at least one sample, for generating a model of estimated radio transmitter positions.

Thus, the model of estimated radio transmitter positions may be generated by bundle optimization, as described in EP3093683, which is herein included by reference. In particular, [0047-0061] of EP3093683 is included by reference, describing details of how the model of estimated radio transmitter positions may be created.

It should be clear that forming the candidate model of transmitters could also be made by using other data than only distance dependent data, for example also by using GNSS data and/or IMU data to more accurately estimate measurement positions and thereby forming a better model of radio transmitter positions.

The radio transmitter modelling samples may be samples obtained through crowdsourcing, e.g. from mobile phones moving around in a building. The radio transmitter modelling samples may comprise distance dependent data in the form of RSS data. From such samples it may be possible to generate the model of estimated radio transmitter positions as described in the first aspect in EP3093683. The model of estimated radio transmitter positions may become more and more accurate the more radio transmitter modelling samples are inputted. Thus, accuracy of the estimated radio transmitter positions may become better and better. Then the model of estimated radio transmitter positions may be used to estimate measurement positions. Thus, the model of estimated radio transmitter positions may, in itself, be used for positioning.

It is now a realization that instead of continuing to feed the model of estimated radio transmitter positions with more and more distance dependent data it may be possible to halt the evolution of the model of estimated radio transmitter positions at a relatively early stage. Newly collected distance dependent data may then together with the model of estimated radio transmitter positions be used to calculate estimated measurement position and estimated accuracy of the newly collected distance dependent data and be inputted into the training dataset of the neural network. Thus, using a first batch of distance dependent data to create the model of estimated radio transmitter positions and a second batch of distance dependent data to train the neural network may in the end create a more accurate model for positioning than using both the first and second batch to evolve the model of estimated radio transmitter positions.

Although the model of estimated radio transmitter positions may have inaccuracies, e.g. for certain radio transmitters and/or for certain sub-environments of the environment or building, those inaccuracies may be conveyed to the neural network through the estimated accuracy of each sample. Thus, the neural network may not be tainted by said inaccuracies. Instead, the neural network may be able to value each sample according to its estimated accuracy.

It should be understood that the model of estimated radio transmitter positions may be generated not only based on distance dependent data from unknown measurement positions. Some of the distance dependent data may be paired with known measurement positions, e.g. manual input of actual position or a valid GPS measurement at an entrance of the building where the accuracy of the GPS measurement is so good that it can be taken as ground truth and no accuracy may be needed. Alternatively, or additionally, some of the radio transmitters may have known positions. Such knowledge of a small number of measurement positions and/or radio transmitter positions may act as seeds of truth that allows the model of estimated radio transmitter positions to in the end become more and more accurate even if it is fed with distance dependent data from unknown measurement positions.

It should be understood that the estimated measurement position and the estimated accuracy of some, or all, samples of the training dataset may be set in other ways than using the model of estimated radio transmitter positions.

As an example, setting the estimated measurement position and the estimated accuracy of each of a plurality of samples of the estimation labeled type in the training dataset may be done by receiving Global Navigation Satellite System data for the measurement position.

The Global Navigation Satellite System (GNSS) data may be data from the global positioning system (GPS data), or the BeiDou Navigation Satellite System, or the Galileo navigation system etc.

Thus, sensor data may be measured at a measurement position and GNSS data may be acquired at the same position, e.g. by the same device acquiring the sensor data. The estimated measurement position may herein be the GNSS position. The estimated accuracy may herein be the horizontal dilution of precision (HDOP) for said GNSS position. Thus, some distance into the building where GPS still works, but works poorly, GPS data may still be used as estimated measurement position with accuracy.

As another example, setting the estimated measurement position and the estimated accuracy of each of a plurality of samples of the estimation labeled type in the training dataset may be done by:

receiving a known position and relative movement data, the relative movement data indicating movement between the known position and the measurement position associated with said sample of the estimation labeled type;

calculating the estimated measurement position and the estimated accuracy to be set for said sample of the estimation labeled type based on the known position and the relative movement data.

Said known position may e.g. be a GPS measurement at an entrance of the building (e.g. in line of sight communication with satellites) where the accuracy of the GPS measurement is so good that it can be taken as ground truth and no accuracy may be needed.

Said relative movement data may be any kind of movement data, relating to movements between the known position and the measurement position associated with said sample, from which the relative relationship between the known position and the measurement position may be calculated. Said relative movement data may comprise inertial measurement data relating to movements between the known position and the measurement position associated with said sample. Inertial measurement data may be data from an accelerometer and/or a gyrator and/or an inertial measurement unit (IMU). Relative movement data may, additionally or alternatively, comprise a heading and a distance, such as a step count, between the known position and the measurement position associated with said sample.

Calculating the estimated measurement position and the estimated accuracy may be done e.g. by dead reckoning, such as pedestrian dead reckoning (PDR).

To exemplify, a mobile phone enters a building. At the entrance it still has a GPS position that may be considered to be ground truth. When entering the building the GPS signal may be lost. However, the mobile phone may still position itself to some extent by dead reckoning based on the last known absolute position at the entrance. At each measurement position the measured RSS signals may be placed in a sample for the training dataset together with an estimate of the measurement position from the dead reckoning and an estimated accuracy from the dead reckoning. Dead reckoning may be subject to cumulative errors. Thus, the more time has passed since the last known position and/or the more times the travelling direction has changed, the worse the accuracy may be. Nevertheless, by including the estimated accuracy in the sample, and thus passing it on to the neural network, the neural network may still be trained on the sample.

It should also be clear that a more accurate estimated measurement position and accuracy could be derived from a combination of an actual estimated position from an IPS like RSS trilateration and a relative estimated position from IMU, often called hybrid systems. There are a number of techniques to combine these two position estimates, for example extended Kalman filter.

Training the Neural Network

The training of the machine learning model may be configured to modify the machine learning model more strongly for samples of the estimation labeled type that have high estimated accuracy than for samples of the estimation labeled type that have low estimated accuracy.

The term "modify the machine learning model" may in the case of a neural network be construed as modifying weights and/or biases of the neural network. Weights may herein be values associated with connections of the neural network. Biases may herein be values associated with nodes of the neural network. Weights and biases may be randomized before training begins. Each sample in the training dataset may have an impact on how weights and biases change during training but the impact may depend on the estimated accuracy of the sample.

The terms "high" and "low" estimated accuracy should be construed as referring to how accurate the estimated measurement positions are.

As previously mentioned, the estimated accuracy may be represented by the inverse of a standard deviation or the inverse of a variance. In this case a high value of the estimated accuracy should be construed as a high estimated accuracy and the sample should have a strong impact on the modification of the neural network. Alternatively, as previously mentioned, the estimated accuracy may be represented by a standard deviation or variance. In this case a high value of the estimated accuracy should be construed as a low estimated accuracy and the sample should have a weak impact on the modification of the neural network.

The training of the machine learning model may comprise calculating, by a loss function, a loss, the loss being based on, for at least one sample of the estimation labeled type in the training dataset, a representation of a difference between the position converted by the machine learning model from sensor data of said at least one sample; and the estimated measurement position of said at least one sample; modifying the machine learning model based on the loss;

wherein the loss function is configured to weigh the impact of said representation of said difference on the loss based on the estimated accuracy of said at least one sample, whereby the training modifies the machine learning model more strongly for a high estimated accuracy than for a low estimated accuracy.

For said at least one sample of the estimation labeled type the representation of a difference of the position converted by the neural network and the estimated measurement position may be a mean square error. The mean square error may be the square of the difference of the position converted by the neural network and the estimated measurement position. The mean square error may be weighted by the estimated accuracy. Weighing the impact of said representation of said difference on the loss based on the estimated accuracy may be done by multiplying the representation of said difference, e.g. mean square error, by the estimated accuracy, in the case the estimated accuracy is represented by the inverse of a standard deviation or the inverse of a variance. Alternatively, the representation of said difference may be multiplied by a function of the estimated accuracy, e.g. a linear or non-linear function.

It should be understood that, in addition to samples of the estimation labeled type, the training dataset may further comprise samples of a labeled type, each sample of the labeled type being associated with a geographic position in the environment or in the vicinity of the environment, each sample of the labeled type comprising:

sensor data, measured at the geographic position associated with the sample, the sensor data being characteristic of the geographic position associated with the sample; and the geographic position associated with the sample; wherein the training of the machine learning model is further based on the sensor data and the geographic position of samples of the labeled type in the training dataset.

The geographic position may be a position that may be taken as ground truth, wherein no estimated accuracy is needed. The geographic position may of course be associated with some kind of accuracy, most measurements of a position cannot be expected to be accurate down to the cm level or mm level. Nevertheless, by not including any estimated accuracy in the sample it is signaled to the neural network that the geographic position is true within some acceptable accuracy and can be considered as ground truth.

The sensor data in a labeled sample may be of the same types as in the estimation labeled samples. For example, the sensor data of a sample of the labeled type may comprise distance dependent data, and/or RSS data, and/or UWB distance measurements, and/or light sensor data, and/or audio data.

The sensor data of a sample of the labeled type may be viewed as features for the training of the neural network. The geographic position of a sample of the labeled type may be viewed as a label for the training of the neural network.

Samples of the estimation labeled type may improve the accuracy of the model created by the neural network. They may allow the neural network to mitigate uncertainties in samples of the estimation labeled type.

Samples of the estimation labeled type may e.g. be samples acquired by a mobile phone close to a window of the building where the accuracy of a GPS measurement of the mobile phone is so good that it can be taken as ground truth and no accuracy may be needed. Alternatively, or additionally, samples of the estimation labeled type may be systematically manually created training data. An engineer may e.g. go to the building and manually measure sensor data at a few locations in the building and note down said locations as known geographic positions. By combining estimation labeled samples with labeled samples only a few locations in the building may need to be visited, just to create enough labeled samples to steer the neural network in the right direction. Had only labeled samples been used the engineer may have had to map out the entire building.

It should be understood that, in addition to samples of the estimation labeled type, the training dataset may further comprise samples of an unlabeled type, each sample of the unlabeled type being associated with an unknown measurement position in the environment, each sample of the unlabeled type comprising sensor data, measured at the unknown measurement position associated with the sample, the sensor data being characteristic of the unknown measurement position associated with the sample;

wherein the training of the machine learning model is further based on the sensor data of samples of the unlabeled type in the training dataset.

The sensor data in an unlabeled sample may be of the same types as in the estimation labeled samples. For example, the sensor data of a sample of the unlabeled type may comprise distance dependent data, and/or RSS data, and/or UWB distance measurements, and/or light sensor data, and/or audio data.

Each sample of the unlabeled type is associated with an unknown measurement position. Thus, the sample may lack a geographic position and lack an estimated measurement position.

While training a neural network only on samples of the labeled type may be seen as supervised learning, training a neural network only on samples of the unlabeled type may be seen as unsupervised learning. Training a neural network on a training dataset comprising both samples of the labeled type and samples of the unlabeled type may be seen as semi-supervised learning. Semi-supervised learning may be performed e.g. using autoencoders for feature extraction. Samples of the unlabeled type may be abundant and/or easy to acquire, e.g. easier to acquire than samples of the estimation labeled type and samples of the labeled type. Just like a combination of labeled samples and unlabeled samples in semi-supervised learning may provide improvements in learning accuracy, a combination of estimation labeled samples and unlabeled samples may provide improvements in learning accuracy.

Preprocessing

How the training dataset is composed may be important to the accuracy of the model created by the neural network. In the following a number of examples will be given of how preprocessing of the training dataset may enhance the accuracy of the model created by the neural network.

According to one example, the method may comprise receiving a candidate training dataset comprising samples of the estimation labeled type;

selecting samples from the candidate dataset to be included in the training dataset, wherein, in at least a sub-environment of the environment, a sample with a high estimated accuracy is selected to be included in the training dataset and a sample with a low estimated accuracy is rejected from being included in the training dataset.

There may be a tradeoff for when low accuracy position estimates give an improvement or instead deteriorates the resulting positioning accuracy of the network. This tradeoff may also look different in various areas of an environment, for example the accuracy can be much higher near entrances than inside a building. For this reason, it may not be straight-forward how to filter away the measurements of too low accuracy without removing too much data in some parts of the environment. One approach may then be to divide the environment into separate sub-environments and study the accuracy of measurements from each sub-environment. If there is an excess of data in one such sub-environment, then the measurements of lowest accuracy may be removed from the dataset.

Selecting samples from the candidate dataset to be included in the training dataset may thus be performed when the number of samples in the candidate dataset in said sub-environment is above a threshold value. If the number of samples in the candidate dataset in said sub-environment is below the threshold value all samples in said sub-environment may be included in the training dataset.

According to another example, the method may comprise receiving a candidate training dataset comprising samples of the estimation labeled type;

comparing estimated accuracy of samples of the candidate training dataset to a threshold accuracy;

rejecting samples from the candidate training dataset having worse estimated accuracy than the threshold accuracy from being included in the training dataset, wherein the threshold accuracy has a value between 0 and 30 meters.

For example, the standard deviation of the estimated measurement position may be below a threshold, wherein the threshold has a value between 0 and 30 meters.

Samples with poor estimated accuracy may have little impact on the modification of the neural network, e.g. through the use of weights, that are based on the estimated accuracy, in the loss function. Nevertheless, there may be samples having too poor estimated accuracy to be included in the training dataset. Thus, samples may be rejected according to a threshold accuracy. Further, what constitutes a suitable threshold accuracy may depend on a current quality of the model created by the neural network. For example, the neural network may be trained several times as more samples become available. In a first training a threshold accuracy may be set high, e.g. 30 m, or a threshold accuracy may not be used at all. In subsequent trainings the threshold accuracy may be lowered as the model becomes better. Alternatively, or additionally, the threshold accuracy may be dependent on a size of the candidate training dataset. For a large candidate training dataset a low threshold accuracy (e.g. measured in meters) may be used, and for a small candidate training dataset a high threshold accuracy (e.g. measured in meters) may be used.

According to another example, the method may comprise augmenting at least one sample of the estimation labeled type, wherein said augmenting comprises:

introducing noise to sensor data of said at least one sample; and/or removing part of the sensor data of said at least one sample; and/or introducing an RSS offset to the sensor data of said at least one sample;

including the at least one augmented sample in the training dataset before training the machine learning model.

Augmenting a sample can be likened to introducing additional data into the dataset, without collecting any new measurements, and may therefore help the neural network to generalize better to new measurements.

Through augmentation a sample may be used to form two versions: the original sample and the augmented sample. The training dataset may thus be expanded. Alternatively, only the augmented sample may be included in the training dataset and the original sample may be discarded. Augmented samples in the training dataset may help to reduce overfitting during the training. Further, the model created by training the neural network may be more robust against future changes in the environment.

Noise may be introduced to sensor data by e.g., in the case of RSS data, perturbing RSS fingerprints slightly. For example, if the sensor data of the sample comprises a plurality of RSS signals, a random value may be added to each RSS signal of the plurality. Such augmented samples may make the model for positioning robust against noise.

Part of the sensor data may be removed by e.g., in the case of RSS data, removing one or more RSS signals from a plurality of RSS signals. Thus, the neural network may be trained to handle situations where radio transmitters are turned off or RSS measurements are missed during a scan.

An RSS offset may be introduced to the sensor data by e.g. modifying an RSS signal to simulate all of the radio transmitters, associated with said RSS signal, being attenuated due to receiver or antenna imperfections compared to the reference. Thus, the neural network may be trained to handle situations with differences in radio receivers and radio transmitters or where a surrounding around a radio transmitter changes (e.g. a door to the room of the radio transmitter being opened or closed).

According to a second aspect, there is provided a method for positioning a device within an environment, the method comprising:

acquiring sensor data, measured at the position of the device, the sensor data being characteristic of the position of the device;

accessing a model for positioning within the environment, wherein the model has been created according to the method of the first aspect;

determining the position of the device based on the acquired sensor data and the accessed model.

Thus, a method is provided for determining locations of devices, which method makes use of the model that is generated as discussed above.

The method for positioning a device within an environment may comprise determining a plurality of positions, of the device, along a track, wherein sensor data is acquired for each of the positions along the track, said method further comprising:

determining a first estimate for each position along the track based on the acquired sensor data for each position and the accessed model;

determining estimated relative positions of the positions along the track based on relative movement data, the relative movement data indicating movement between at least two positions along the track;

improving the first estimates for each position along the track using the estimated relative positions.

Thus, the device may be positioned by the model together with relative movement data. The use of relative movement data may improve the accuracy of the positioning. Alternatively, or additionally, the use of relative movement data may mitigate the effect of changes in the environment that are not accounted for in the model. For example, a radio transmitter that has been turned off or moved may cause an error in the positioning. Such an error may, at least partially be corrected by the use of relative movement data.

Relative movement data may comprise inertial measurement data relating to movements between two positions along the track. For example, relative movement data may comprise data from an accelerometer and/or a gyrator and/or an inertial measurement unit, IMU, tracking the movements between two positions along the track. Relative movement data may comprise a heading and a distance, such as a step count, between two positions along the track. The relative movement data may indicate movements between each pair of neighboring positions along the track. However, it should be understood that the relative movement data may not necessarily indicate movements between neighboring positions and not necessarily between all positions of the track. To exemplify, consider a track of 12 positions. Relative movement data may be received for the movements between position 1 and 4, between position 4 and 8, and between position 8 and 12. In another example, relative movement data may be received for the movements between position 1 and 2, between position 5 and 6, and between position 8 to 12.

Determining estimated relative positions of the positions along the track may be performed e.g. using a machine learning model. The estimated relative position of a position may be an estimate of how said position relates to a preceding or succeeding position.

The second aspect may have the same advantages, or similar advantages, as the first aspect encompassed by the claims in this application and may possibly be the subject of a future divisional application.

BRIEF DESCRIPTION OF THE DRAWINGS

The above, as well as additional objects, features and advantages of the present inventive concept, will be better understood through the following illustrative and non-limiting detailed description, with reference to the appended drawings. In the drawings like reference numerals will be used for like elements unless stated otherwise.

FIG. 2 illustrates a flowchart of a method for creating a model for positioning within an environment.

FIG. 6 illustrates a neural network.

FIG. 7 illustrates positioning.

FIG. 8 illustrates positioning.

DETAILED DESCRIPTION

In cooperation with attached drawings, the technical contents and detailed description of the present invention are described hereinafter according to preferable embodiments, being not used to limit the claimed scope. This invention may be embodied in many different forms and should not be construed as limited to the embodiments set forth herein; rather, these embodiments are provided for thoroughness and completeness, and fully convey the scope of the invention to the skilled person.

As an example of a possible implementation of our invention, we here describe an artificial neural network based positioning solution being trained by estimated positions in a building with corresponding estimated accuracies and received signal strength (RSS) as sensor values. It should be clear that there are a number of different implementation alternatives; different neural network architectures, many different sensor types that can be combined in multiple ways, many positioning estimation techniques and many ways of estimating positioning accuracy that are all covered in the intention and scope of this patent.

Assume a delimited 3D environment (or 2D in the case of single floor/ground environments), where the first two dimensions correspond to latitude and longitude, and the third dimension is the altitude or floor. The environment here is assumed to be mostly indoor, but could be outdoor or a combination of the two. From this environment, sensor data 12, in this example received signal strength (RSS) data from radio receivers, are measured by one or multiple devices at different locations within the environment. The signal, whose signal strength is measured, may for example originate from Wi-Fi and Bluetooth beacons, iBeacons, etc. By use of these measurements alone, or in combination with other sensor data such as inertial sensors, the measurement positions may be estimated.

Figure 1A:
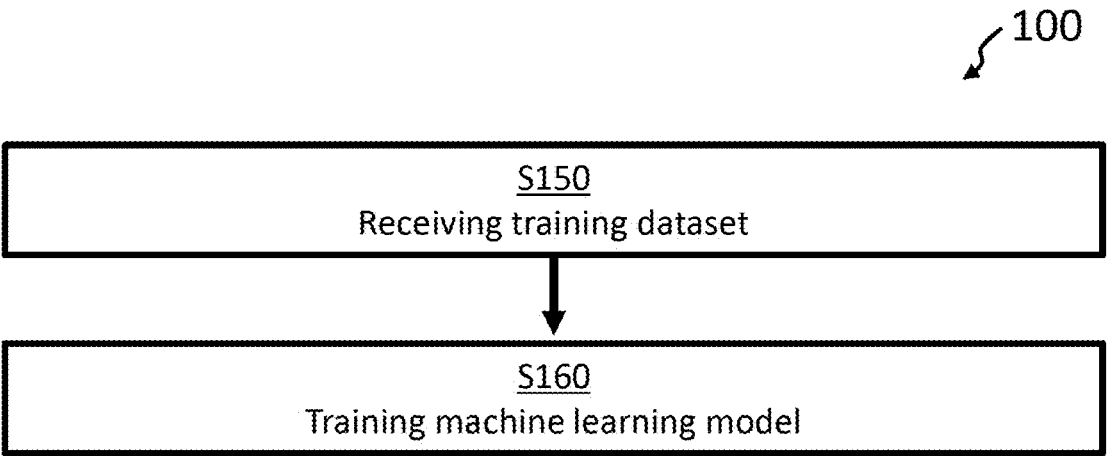
FIG. 1a illustrates a flowchart of a method for creating a model for positioning within an environment.
Figure 1B:
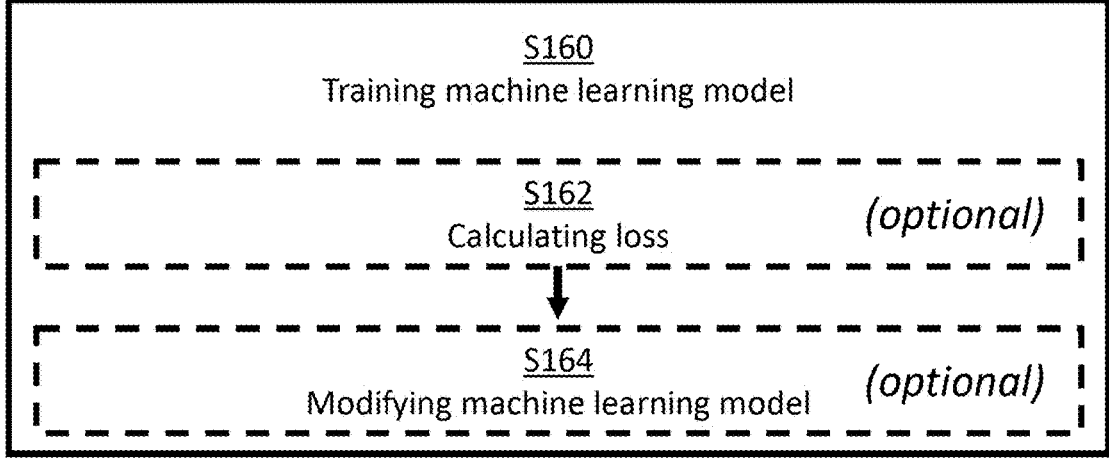
FIG. 1b illustrates a flowchart of a method for training a machine learning model.
Figure 1C:
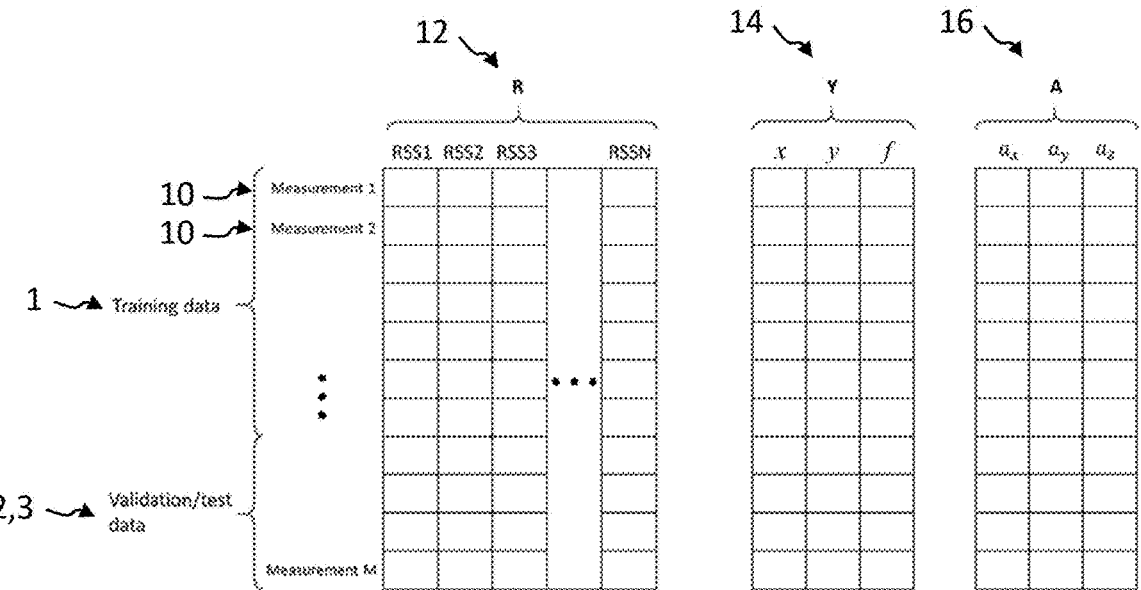
FIG. 1c is a schematic illustration of a dataset.

FIG. 1c is a schematic illustration of a dataset to be used for creating the model for positioning within an environment. The dataset comprises samples 10 of the estimation labeled type. The data is divided into a training dataset 1 and a validation dataset 2. The figure illustrates measurements at M measurement positions in the environment that have been gathered during a collection phase, where N unique sources of sensor data 12, in this case RSS data, were detected in total. Let R be an M×N matrix containing a collection of the RSS data, each column corresponding to a specific source of RSS data, i.e. a specific radio transmitter. It should be noted that all radio transmitters may not be detectable at any given measurement position, undetected radio transmitters may be assigned a value corresponding to the lowest possible signal strength for the type of radio transmitter or be assigned a NaN (Not a Number) value. Then, let Y be an M×3 matrix (or M×2 in the 2D setting) containing the 3D estimated measurement positions 14 for the M measurements, and let A be a M×3 matrix (or M×2 in the 2D setting) comprising estimated accuracies 16 of these estimated measurement positions 14. The estimated accuracy may comprise an accuracy value for each separate dimension, as illustrated by $a_x$, $a_y$, and $a_z$ in matrix A in FIG. 1c. Alternatively, the estimated accuracy may comprise an accuracy value that relates to more than one dimension. For example, matrix A in FIG. 1c could comprise accuracy values $a_{xy}$, and $a_z$, wherein the estimated accuracy in both the x-dimension and the y-dimension is $a_{xy}$. The third dimension in Y can be either estimates of the floor or the altitude. The matrices R, Y, and A will be referred to as a dataset, which is related to one specific 3D environment. The number of sensor measurements M and number of detected signal sources N can be any numbers, but in general the larger the dataset, the better the possibilities are of accurate positioning.

The illustrated dataset is divided into subsets for training and validation and/or testing, i.e. into a training dataset 1, a validation dataset 2 and/or a test dataset 3. The training dataset 1 is used to train a machine learning model 20, whereby the model for positioning within the environment is created. In the following the machine learning model 20 will be exemplified by a neural network 20. The validation dataset 2 can be used to determine when the model is of sufficient quality, and tune parameters of the neural network 20, and the test dataset 3 can be used to get a measure of the final performance of the model. When training a neural network 20 and using the validation dataset 2 to determine when to terminate the training, the evaluation can for consistency use the corresponding estimated accuracies 16 as weights as well. Another approach may be to choose a few samples 10 with high estimated accuracy 16 to use for evaluation. While the model may be created using only the training dataset 1, a validation dataset 2 and/or a test dataset 3 may be important for evaluating the resulting model and training progress.

Figure 1D:
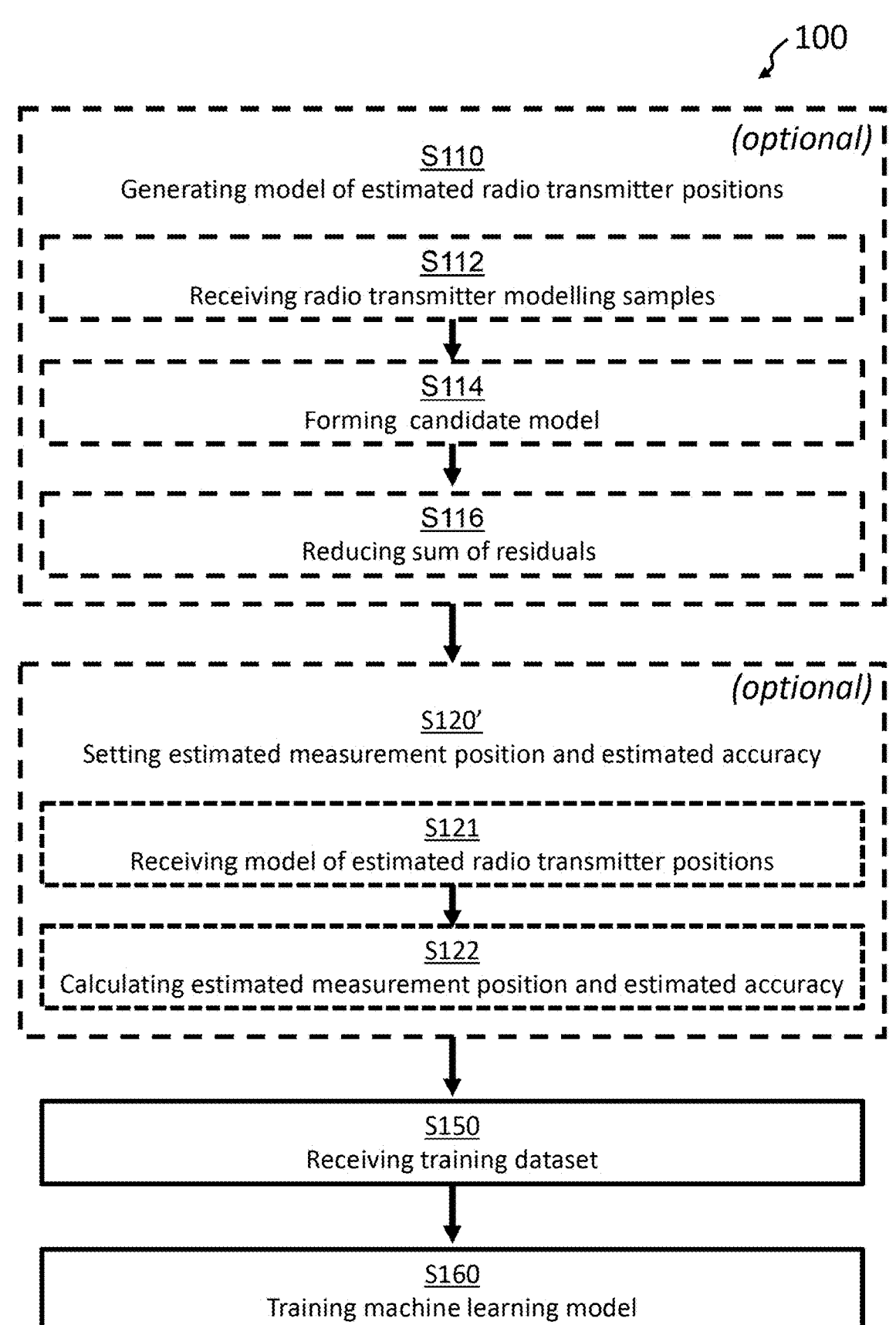
FIG. 1d illustrates a flowchart of a method for creating a model for positioning within an environment.
Figure 3:
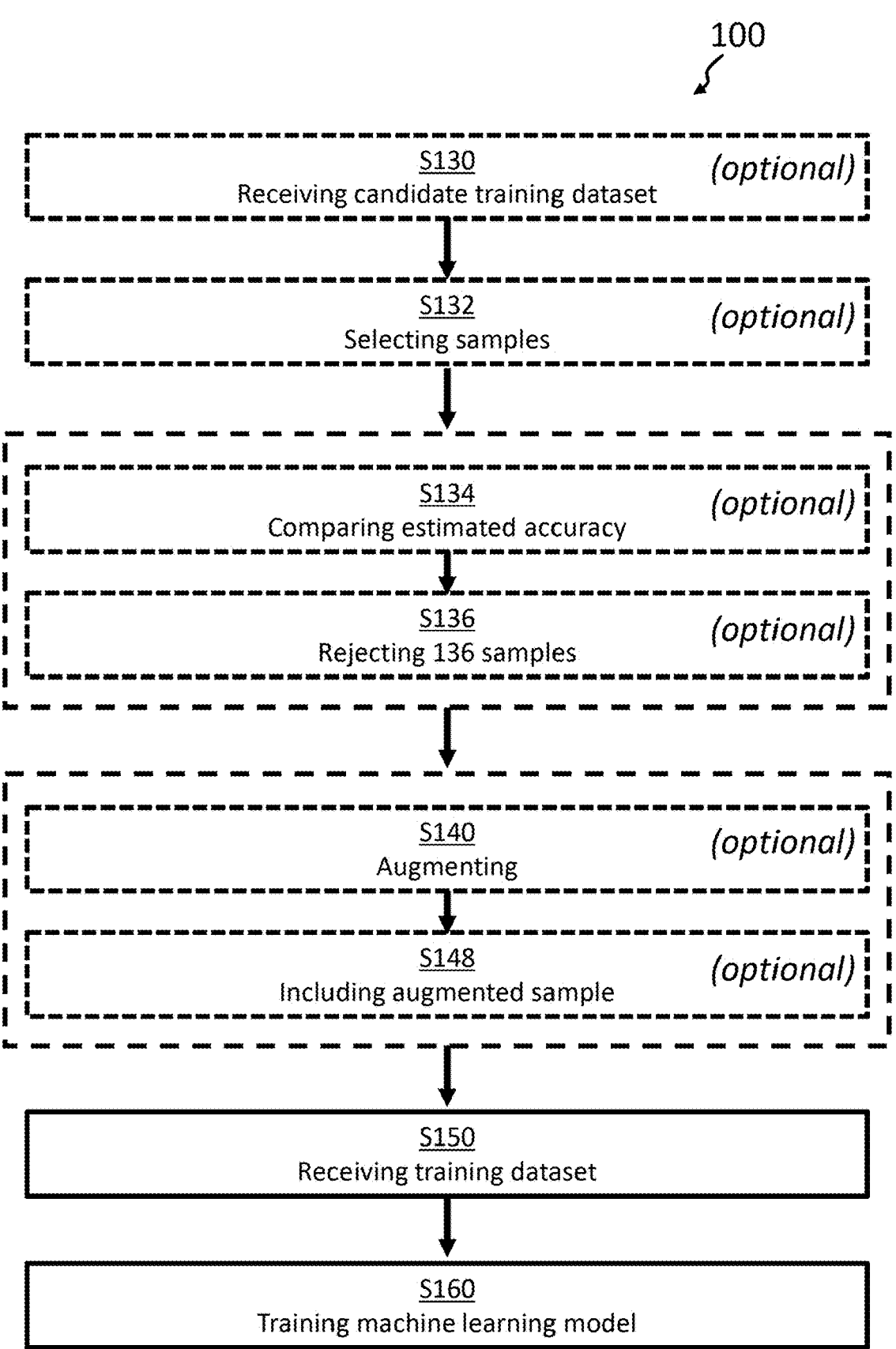
FIG. 3 illustrates a flowchart of a method for creating a model for positioning within an environment.

FIG. 1a illustrates a flowchart of a method 100 for creating a model for positioning within an environment. The method 100 is herein described as comprising the steps S150 and S160. However, it should be understood that the method 100 may comprise some optional steps, as indicated in the FIG. 1d. It should be understood that at least some of the steps may be performed in a different order than indicated in the figures, as readily understood by the skilled person. Alternative, or additional, steps in performing the method 100 are illustrated in FIGS. 2 and 3. All figures comprise the steps of receiving S150 the training dataset 1 and training S160 the neural network 20. FIGS. 1d and 2 elaborate on different ways of setting S120 the estimated measurement positions 14 and estimated accuracies 16 for the samples 10. FIG. 3 elaborate on different ways of preprocessing data to be included in the training dataset 10. The methods 100 illustrated in FIG. 1-3 may be performed on a computing unit, e.g. on a server.

In the following, the steps of receiving S150 the training dataset 10 and training S160 the neural network 20 will be described. The other optional steps will be described later.

The received S150 training dataset 10 may be a training dataset 10 as described in conjunction with FIG. 1c. The sensor data 12 of the samples 10 of the training dataset 10 (in matrix R) may comprise RSS data (as illustrated in FIG. 1c) and/or UWB distance measurements, and/or light sensor data, and/or audio data, and/or any kind of distance dependent data. The estimated measurement positions 14 (in matrix Y) and the estimated accuracies 16 (in matrix A) of the samples 10 of the training dataset 10 may be created or set in various ways, as discussed below. For now, let us just assume that they have already been created/set.

The neural network 20 is trained S160 to convert sensor data 12 to a position in the environment, wherein the training S160 is based on the samples 10 of the estimation labeled type in the training dataset 1. There are multiple architectures possible for use in this neural network 20, for example autoencoders, long short-term memory (LSTM)-units, or multi-layer perceptrons.

The training S160 of the neural network 20 may be configured to modify the neural network 20 more strongly for samples 10 of the estimation labeled type that have high estimated accuracy (accuracy figure in meters is low) 16 than for samples 10 of the estimation labeled type that have low estimated accuracy 16 (accuracy figure in meters is high). Accordingly, the neural network 20 may be trained using batches of R as input, wherein the loss function in the training S160 is a measure of the positioning error, weighted by the accuracy. This means that measurements with a high accuracy may have a higher impact on the model training than low-accuracy measurements. Accordingly, the training S160 may e.g. comprise, as illustrated in FIG. 1b calculating S162 a loss, and modifying S164 the neural network 20 based on the loss.

One possible neural network architecture that deals with the situation of having continuous estimates of latitude [x] and longitude [y], but discrete values for the altitude, i.e. floor [f], is presented here. This network consists of two multi-layer perceptrons (MLPs) that are trained simultaneously. Let the positioning MLP be called $E_p$, the floor classification MLP $E_f$. An input matrix R of sensor data 12 to the neural network 20 results in two outputs $$E(R)=[\hat{x},\hat{y}] \text{ and } E_f(R)=\hat{f},$$

where $[\hat{x},\hat{y},\hat{f}]$ is the 3D position output of the neural network 20. The loss function used to train the neural network 20 for one sample 10 may then be given by $$L(\hat{x},\hat{y},\hat{f};x,y,f)=a_x(x-\hat{x})^2+a_y(y-\hat{y})^2-a_fC\log(P(f|\hat{f})),$$

where C is a constant, $a=[a_x, a_y, a_f]$ is the estimated accuracy 16 of this estimated measurement position 14 [x, y, f]. The estimated accuracy may herein be the inverse of the standard deviation, or variance, of errors of estimated measurement positions 14.

$$P(f|\hat{f})=\sigma(q_0-\hat{f}), \text{ if } f=0,$$

$$\sigma(q_k-\hat{f})-\sigma(q_{k-1}-\hat{f}), \text{ if } 0<f<n_f,$$

$$1-\sigma(q_{n_f-1}-\hat{f}), \text{ if } f=n_f,$$

where $n_f$ is the number of floors, a is the sigmoid function, and $q_k=k/n_f$. The neural network 20 may be trained using common neural network techniques such as augmentations, dropout, batch-normalization, etc. A few possible augmentations useful for measurements of RSS are dropping beacons, adding an offset, and adding noise to the measurements. This can be likened to introducing additional data into the dataset, without collecting any new measurements, and it therefore helps the network to generalize better to new measurements.

If the altitude is a continuous value [z] the loss function can instead be for example $$L(\hat{x},\hat{y},\hat{z};x,y,z)=a_x(x-\hat{x})^2+a_y(y-\hat{y})^2+a_z(z-\hat{z})^2,$$

and if the accuracy is estimated for the complete position estimate, rather than for each component separately, the weighting of the loss function may be $$L(\hat{x},\hat{y},\hat{z};x,y,z)=a((x-\hat{x})^2+(y-\hat{y})^2+(z-\hat{z})^2),$$

where a is a measure of the accuracy for all components of the position estimate.

In the above examples $(x-\hat{x})$ represents a difference (in the one of the three dimensions) between the position ($\hat{x}$ for said one dimension) converted by the neural network 20 from sensor data 12 (in this case R); and the estimated measurement position (x for said one dimension). When the loss is calculated S162 in the above examples the loss function is configured to weigh the impact of said difference on the loss based on the estimated accuracy 16. The weighing is herein done by multiplying said difference with the corresponding estimated accuracy 16. In the above examples the loss is calculated for one sample 10 alone. It should be understood that the training S160 may be performed as batch training, wherein a number of samples may be processed in one batch before the neural network 20 is modified S164, i.e. before the neural network 20 is updated. The loss may be calculated S162 for the entire batch, e.g. by summing the losses associated with the individual samples 10.

After calculating S162 the loss, the neural network 20 may be modified S164. Weights and/or biases of the neural network 20 may be modified S164. Weights may herein be values associated with connections of the neural network 20. Biases may herein be values associated with nodes of the neural network 20. Weights and biases may be randomized before training S160 begins.

In the above examples the neural network 20 has been configured to output a position. The neural network 20 may additionally be configured to output a measure of the accuracy. This may be useful during online positioning. The above neural network can for this purpose be altered to estimate a probability distribution of the position instead of just the actual position. Since the floor-estimate above results in a probability for each floor, this variable already has an estimate of the accuracy. The output of the positioning neural network may, on the other hand, be altered to be $[\hat{\mu}_x,\hat{\sigma}_x,\hat{\mu}_y,\hat{\sigma}_y]$ instead of $[\hat{x},\hat{y}]$. It is assumed that $$P(x, y \mid \mu_x, \sigma_x, \mu_y, \sigma_y) = \frac{1}{2\pi\sigma_x\sigma_y}\exp\left(\frac{(x-\mu_x)^2}{\sigma_x^2} + \frac{(y-\mu_y)^2}{\sigma_y^2}\right),$$

which results in the loss function $$L(\hat{\mu}_x,\hat{\sigma}_x,\hat{\mu}_y,\hat{\sigma}_y,\hat{f};x,y,f)=-\sqrt{a_x^2+a_y^2}\log(P(x,y|\hat{\mu}_x,\hat{\sigma}_x,\hat{\mu}_y,\hat{\sigma}_y))-a_fC\log(P(f|\hat{f})),$$

for the original problem formulation. It can be shown that this neural network architecture can produce estimates of the magnitude of positioning errors for new measurements that are correlated to the true errors.

FIGS. 1*d* and 2 illustrate three different ways of setting S120', S120", S120''' the estimated measurement positions 14 and estimated accuracies 16 for the samples 10. The flowchart of FIG. 2 illustrates a combination of two different ways of performing setting step S120", S120'''. However, it should be understood that any of the three ways S120', S120", S120''' may be used on its own or in combination with any one of the other ways of setting S120', S120", S120'''. For example, for one subset of samples 10 of the training dataset 1 the estimated measurement positions 14 and estimated accuracies 16 may be set using S120' while for another subset of samples 10 of the training dataset 1 the estimated measurement positions 14 and estimated accuracies 16 may be set using S120".

In FIG. 1*d* setting S120' the estimated measurement position (14) and the estimated accuracy 16 of a sample 10 of the estimation labeled type in the training dataset 1 is performed by:

receiving S121 a model of estimated radio transmitter positions in the environment; and calculating S122 the estimated measurement position 14 and the estimated accuracy 16 to be set for said sample 10 of the estimation labeled type based on distance dependent measurements to the transmitters and the model of estimated radio transmitter positions.

For example, RSS measurements of the sample may indicate distances to a number of radio transmitters whose estimated positions can be found in the model. By trilateration, the estimated measurement position of the sample and the estimated accuracy may be found. Alternatively, an estimated measurement position may be guessed and then iteratively improved by iterative reduction of residuals.

As further illustrated in FIG. 1*d* the model of estimated radio transmitter positions may be generated S110 by:

receiving S112 radio transmitter modelling samples comprising distance dependent data;

forming S114 a candidate model of estimated radio transmitter positions and estimated measurement positions 14 of the radio transmitter modelling samples based on the received radio transmitter modelling samples and a plurality of defined positions for samples and/or for radio transmitters; and iteratively reducing S116 a sum of residuals for said candidate model.

The received S112 radio transmitter modelling samples may comprise RSS data. The received S112 radio transmitter modelling samples may be a matrix similar to R, described in conjunction with FIG. 1. When the model of estimated radio transmitter positions is generated this way we call it generating the model by bundle optimization.

The candidate model may be formed S114 by e.g. guessing estimated radio transmitter positions and estimated measurement positions 14 of the radio transmitter modelling samples. Alternatively, the candidate model may be based on an old model.

In addition to the received radio transmitter modelling samples there may be a plurality of defined positions for samples and/or for radio transmitters. For example, some of the radio transmitter modelling samples may be samples of a labeled type and thereby be associated with a geographic position. In another example, the position of some of the radio transmitters may be known. Such defined positions may be included in the candidate model. The candidate model may then comprise e.g. a number of estimated measurement positions 14 of the radio transmitter modelling samples, a number of estimated radio transmitter positions, and a number of known radio transmitter positions (and/or a number of known measurement positions).

For each radio transmitter modelling sample, a difference may be calculated, the difference may be a difference between an estimated distance between the measurement position of said sample and a radio transmitter as represented by the model; and a measured distance between the measurement position of said at least one sample and the radio transmitter as represented by the distance dependent data. Said difference may represent a residual. This may be repeated for all samples and all radio transmitters such that a sum of residuals may be formed. When a position is known, e.g. a measurement position or a radio transmitter position is known, the known position is used instead of an estimated one. The sum of residuals may then represent how far off the model is from the truth, as represented by the measured distance dependent data. The model of estimated radio transmitter positions may then be updated and a new sum of residuals may be calculated, and so forth. This may be repeated for a fixed number of repetitions or until the sum of residuals goes below a threshold value.

Once the model of estimated radio transmitter positions is finished it may be used to set estimated measurement position 14 and the estimated accuracy 16 of a sample 1 of the estimation labeled type in the training dataset 1. The radio transmitter modelling samples may e.g. together with estimated measurement positions 14 and the estimated accuracies 16 of the last iteration of the model of estimated radio transmitter positions form part of the training dataset 1 for training S160 the neural network 20. Alternatively, or additionally, when the model of estimated radio transmitter positions is finished, new distance dependent data may be inputted into the model such that new estimated measurement positions 14 and new estimated accuracies 16 are received. The new distance dependent data and the new estimated measurement positions 14 and the new estimated accuracies 16 may then form new samples 10 for training S160 the neural network 20. Forming such new samples may be done for one sample 10 at a time or for a plurality of samples 10 at a time. Alternatively, or additionally, when the model of estimated radio transmitter positions is finished, new distance dependent data may be used together with the model to find new estimated measurement positions 14 and the estimated accuracies 16 through triangulation.

As seen in FIG. 2, setting S120''' the estimated measurement position 14 and the estimated accuracy 16 of a sample 10 of the estimation labeled type in the training dataset 1 may be performed by:

receiving S126 a known position and relative movement data, the relative movement data indicating movement between the known position and the measurement position associated with said sample 10 of the estimation labeled type; and calculating S127 the estimated measurement position 14 and the estimated accuracy 16 to be set for said sample 10 of the estimation labeled type based on the known position and the relative movement data.

The known position may be a manually set position or a GPS position measured at an earlier time and the relative movement data may e.g. be data from an inertial measurement unit that has recorded data along a path from the known position to the measurement position. Thus, the measurement position may be estimated from the known position and the relative movement data. The estimated measurement position may e.g. be calculated through dead reckoning.

As described in conjunction with step S120' and S120''' the estimated measurement position 14 and the estimated accuracy 16 of a sample 10 may be calculated. Additionally, or alternatively, the estimated measurement position 14 and the estimated accuracy 16 of a sample 10 may be received.

As seen in FIG. 2 setting S120'' the estimated measurement position and the estimated accuracy of each of a plurality of samples of the estimation labeled type in the training dataset may be done by receiving S124 Global Navigation Satellite System data for the measurement position. The estimated measurement position may herein be the GNSS position. The estimated 2D accuracy may herein be the GPS estimated accuracy or the horizontal dilution of precision (HDOP) for said GNSS position, and respectively, the vertical accuracy may be the GPS estimated altitude accuracy or the vertical dilution of precision (VDOP).

Before receiving S150 the training dataset 1 some preprocessing may be done. Preprocessing may be done at the same computing unit that receives S150 the training dataset 1 and performs the training S160 of the neural network 20. Alternatively, preprocessing may be performed on a separate computing unit.

A candidate training dataset comprising samples 10 of the estimation labeled type may be received S130.

Samples 10 from the candidate dataset to be included in the training dataset 1 may be selected S132. A sample 10 with a high estimated accuracy 16 may be selected to be included in the training dataset 1 and a sample 10 with a low estimated accuracy 16 may be rejected from being included in the training dataset 1.

The estimated accuracy 16 of samples 10 of the candidate training dataset may be compared S134 to a threshold accuracy. Samples 10 from the candidate training dataset having worse estimated accuracy 16 than the threshold accuracy may be rejected S136 from being included in the training dataset 1. The threshold accuracy may have a value between 0 and 30 meters.

Some samples, e.g. samples from a candidate training dataset may be augmented S140 before including S148 the augmented sample 10 in the training dataset 1. Augmenting S140 may be done by e.g.:
  introducing noise to sensor data 12 of a sample 10; and/or
  removing part of the sensor data 12 of a sample 10, reflecting changes in the environment or missed RSS sensor data due to timing of a scan; and/or
  introducing a RSS offset to the sensor data 12 of a sample 10, reflecting differences in RSS calibration and/or antenna performance.
  Preprocessing may additionally, or alternatively, comprise normalizing, e.g. normalizing RSS data. RSS data may be normalized into the range [0,1].

Alternatively, RSS data may be normalized by subtracting the mean and dividing by the estimated standard deviation. Normalizing may provide better training performance and high training stability, depending on the properties of the original signal. In the case of WiFi AP RSS, the common situation may be to normalize measurements from the interval [−100,0] to [0,1]. Missing values may in this case be assigned the value 0. Each of the N beacons may give rise to a unique input to the neural network 20, which means that if for example 200 such beacons have been detected in the training phase, the input dimension may be 200 for all measurements.

The created model for positioning within an environment may after training be used for real-time positioning. For example, RSS measurements of WiFi APs and/or BLE beacons may be used to directly receive a most likely position. It has been seen that the computational effort for creating a position may be much lower than for doing a corresponding position calculation using kNN fingerprinting algorithms. Thus, the created model may be better suited for high volume low latency positioning at the expense of the non-time-critical training effort.

Depending on the device that is being positioned, there may be access to additional sensor measurements during online positioning, in addition to the sensors that were used for generating the above positioning model. This can for example be inertial sensors that measure how the device is moving in some frame of reference. If the same measurements are also available during the above collection of a dataset these can be included in the model, for example in a recurrent neural network. Such measurements can also be combined with the above model independently. One way to do this is to use methods based on the Kalman filter and/or Kalman smoother equations.

Figure 4:
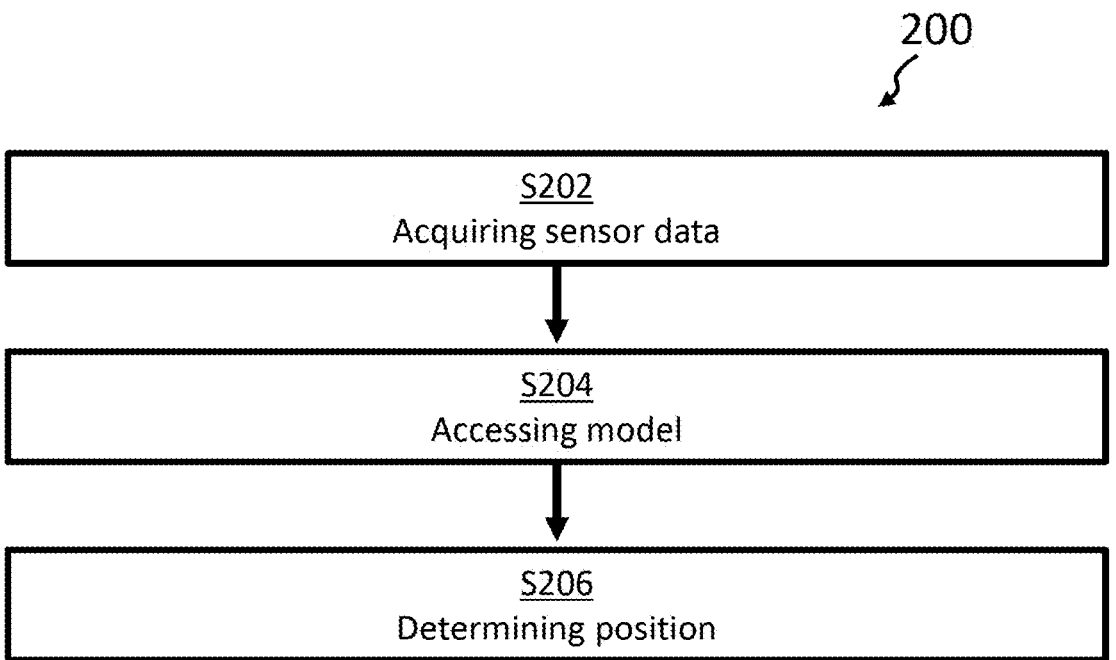
FIG. 4 illustrates a flowchart of a method for positioning within an environment.

FIG. 4 illustrates a flowchart of a method 200 for positioning within an environment.

The method 200 comprises acquiring S202 sensor data 12, measured at the position of the device, the sensor data 12 being characteristic of the position of the device. The sensor data may be the same type of sensor data 12 that has been used for training the neural network 20.

The method 200 further comprises accessing S204 the model, for positioning within the environment, that is described above.

The method 200 further comprises determining S206 the position 30 of the device based on the acquired sensor data 12 and the accessed model.

As an example, the method may be performed by a device, e.g. a mobile phone, acquiring S202 sensor data 12 such as RSS data at the position of the device. The model may then be accessed S204 e.g. by the device sending the sensor data 12 to a server comprising a neural network 20 that has been trained on that type of data. In this case the neural network 20 may have been trained on RSS data (it may additionally have been trained to handle also other types of sensor data). Alternatively, the neural network 20 may be situated on the device itself. The neural network 20 may e.g. have been trained on a server and then transferred to the device after training. The sensor data 12 may be inputted to the neural network 20 and the neural network 20 may then output the position 30 of the device as $[\hat{x},\hat{y},\hat{f}]$. This is illustrated in FIG. 6.

A plurality of positions 30 of the device may be determined along a track 40. This may be done by for each separate position determining S206 the position 30 of the device directly from the output from the neural network 20, as illustrated in FIG. 7.

Figure 5:
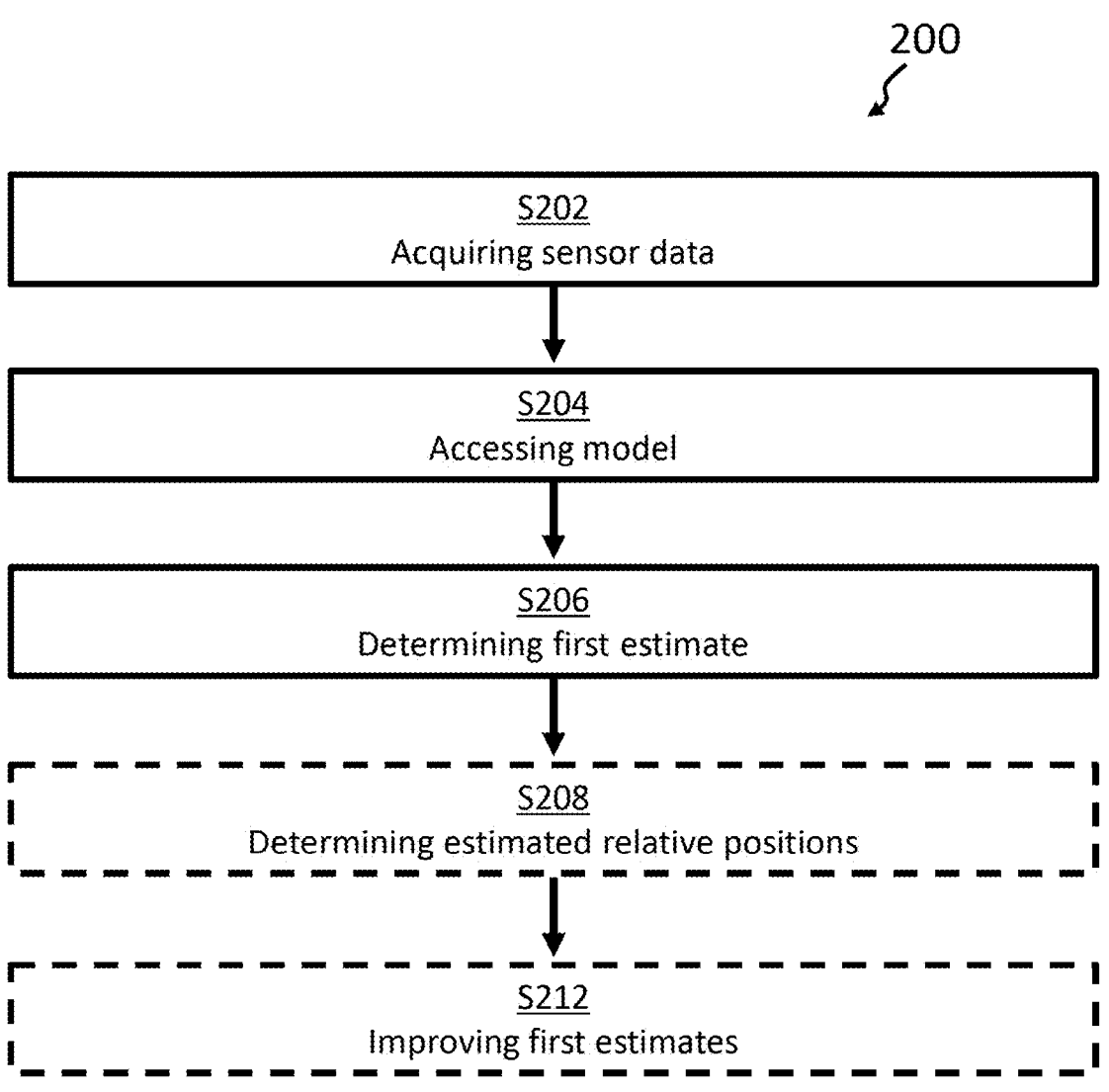
FIG. 5 illustrates a flowchart of a method for positioning within an environment.

Alternatively, the output from the neural network 20 may be combined with relative movement data 44 for better positioning, as illustrated in FIG. 8. A flowchart of this is illustrated in FIG. 5. Herein, the output from the neural network 20 may be taken as a first estimate 42 for each position 30 of the device. Relative movement data 44 associated with the plurality of positions 30 along the track 40 may then be received. For example, both sensor data 12 and relative movement data 44 may be received, e.g. simultaneously, by a computing unit, e.g. a server or a computing unit on the device itself, that performs the positioning.

Estimated relative positions of the positions 30 along the track 40 may be determined S208 based on the relative movement data 44. Estimated relative positions of the positions 30 along the track 40 may be determined S208 e.g. using a neural network (such as a neural network model separate from the neural network 20 that herein is described to generate the first estimate 42) or using a conventional computer program. The first estimates 42 for each position 30 of the device may then be improved S212 using the estimated relative positions.

One way to improve S212 the first estimates 42 for each position 30 of the device using the estimated relative positions may be to use optimization based on the Kalman smoother, as shown in the following example. The example is in 2D. As understood by the skilled person, the example is also applicable in 3D. Consider a number of first estimates 42 $\hat{p}_i$ and estimated relative positions $\hat{\Delta}_{pi}$. The positions based on the first estimates 42 may differ slightly from positions based on relative movement data 44, as seen in FIG. 8. The relative movement data 44 in FIG. 8 is IMU data but may alternatively be e.g. a heading and a step count between two positions along the track.

In this example, the optimization problem that is solved to improve estimates of positions may be given by $$\mathrm{argmin}_p \frac{1}{s_1^2}\sum_{k=1}^{K}\|p_i-\hat{p}_i\|^2 + \frac{1}{s_2^2}\sum_{k=1}^{K-1}\|p_{i+1}-p_i-\Delta\hat{p}_i\|^2,$$

where there are K subsequent estimated points $\hat{p}$ to be improved by use of K−1 estimated movements between these points $\tilde{\Delta p}$. Herein, $p_i=[x_i,y_i]$ and $\hat{p}_i=[\hat{x}_i, \hat{y}_i]$. Further, $\hat{\Delta}_{pi}$ represents the relative movement, according to the relative movement data 44, between $\hat{p}_i$ and $\hat{p}_{i+1}$. Further, this exemplified optimization problem is weighted by $s_1$ and $s_2$ which are the estimated standard deviations (in 2D) of the mod& errors, which could be estimated based on model performance on validation and/or test sets. $s_1$ relates to the errors in position estimates $\hat{p}$ and $s_2$ relates to the errors in relative movement estimates $\tilde{\Delta p}$.

In the above the inventive concept has mainly been described with reference to a limited number of examples. However, as is readily appreciated by a person skilled in the art, other examples than the ones disclosed above are equally possible within the scope of the inventive concept, as defined by the appended claims.

What is claimed is:

1. A method for creating a machine learning model for positioning within an environment, the method comprising:
   receiving a training dataset comprising samples of an estimation labeled type, each sample of the estimation labeled type being associated with a measurement position in the environment, each sample of the estimation labeled type comprising:
   first sensor data measured at the measurement position associated with the sample, the first sensor data being characteristic of the measurement position associated with the sample;
   an estimated measurement position, being an estimate of the measurement position associated with the sample, wherein the estimated measurement position is derived from the first sensor data; and an estimated accuracy being an estimate of an accuracy of the estimated measurement position, wherein the estimated accuracy is derived from the first sensor data; and
   training the machine learning model to convert the first sensor data to a position in the environment, wherein the training is based on the samples of the estimation labeled type in the training dataset, whereby the machine learning model for positioning within the environment is created, and the training of the machine learning model comprises:
   calculating, by a loss function, a loss, the loss being based on, for one or more samples of the estimation labeled type in the training dataset, a representation of a difference between:
      the position converted by the machine learning model from the first sensor data of the one or more samples; and
      the estimated measurement position of the one or more samples; and
   modifying the machine learning model based on the loss;
   wherein the loss function is configured to weigh the impact of the representation of the difference on the loss based on the estimated accuracy of the one or more samples, such that the training modifies the machine learning model more strongly for samples of the estimation labeled type that have high estimated accuracy than for samples of the estimation labeled type that have low estimated accuracy.

2. The method of claim 1, wherein the first sensor data of one or more samples comprises distance dependent data, the distance dependent data comprising an indication of a distance between the measurement position associated with the one or more samples and a radio transmitter.

3. The method of claim 1, wherein the first sensor data comprises received signal strength (RSS) data from one or more radio transmitters in the environment.

4. The method of claim 1, further comprising setting the estimated measurement position and the estimated accuracy of a sample of the estimation labeled type in the training dataset by:
   receiving a model of estimated radio transmitter positions in the environment; and
   calculating the estimated measurement position and the estimated accuracy to be set for the sample of the estimation labeled type based on distance dependent measurements to the transmitters and the model of estimated radio transmitter positions.

5. The method of claim 4, further comprising generating the model of estimated radio transmitter positions by:
   receiving radio transmitter modelling samples, each radio transmitter modelling sample being associated with a measurement position in the environment or in the vicinity of the environment, each radio transmitter modelling sample comprising:
   distance dependent data, the distance dependent data measured at the measurement position associated with the radio transmitter modelling sample, the distance dependent data comprising an indication of a distance between the measurement position of the radio transmitter modelling sample and a radio transmitter;
   forming a candidate model of estimated radio transmitter positions and the estimated measurement positions of the radio transmitter modelling samples based on the received radio transmitter modelling samples and a plurality of defined positions for samples or for radio transmitters;

iteratively reducing a sum of residuals for the candidate model, wherein one or more residuals are based on, for one or more samples of the received radio transmitter modelling samples, a difference between:

an estimated distance between the measurement position of the one or more samples and a radio transmitter as represented by the model, and a measured distance between the measurement position of the one or more samples and the radio transmitter as represented by the distance dependent data of the one or more samples, for generating a model of estimated radio transmitter positions.

6. The method of claim 1, further comprising setting the estimated measurement position and the estimated accuracy of a sample of the estimation labeled type in the training dataset by:

receiving a known position and relative movement data, the relative movement data indicating movement between the known position and the measurement position associated with the sample of the estimation labeled type; and calculating the estimated measurement position and the estimated accuracy to be set for the sample of the estimation labeled type based on the known position and the relative movement data.

7. The method of claim 1, further comprising:

receiving a candidate training dataset comprising samples of the estimation labeled type; and selecting samples from the candidate training dataset to be included in the training dataset, wherein, in one or more sub-environments of the environment, a sample with a high estimated accuracy is selected to be included in the training dataset and a sample with a low estimated accuracy is rejected from being included in the training dataset.

8. The method of claim 1, further comprising:

receiving a candidate training dataset comprising samples of the estimation labeled type;

comparing estimated accuracy of samples of the candidate training dataset to a threshold accuracy; and rejecting samples from the candidate training dataset having worse estimated accuracy than the threshold accuracy from being included in the training dataset, wherein the threshold accuracy has a value between 0 and 30 meters.

9. The method of claim 1, wherein the environment for the positioning is a building and the estimated measurement position includes a height or a floor indicator.

10. A method for creating a machine learning model for positioning within an environment, the method comprising:

receiving a training dataset comprising samples of an estimation labeled type, each sample of the estimation labeled type being associated with a measurement position in the environment, each sample of the estimation labeled type comprising:

first sensor data measured at the measurement position associated with the sample, the first sensor data being characteristic of the measurement position associated with the sample;

an estimated measurement position, being an estimate of the measurement position associated with the sample, wherein the estimated measurement position is derived from the first sensor data; and an estimated accuracy being an estimate of an accuracy of the estimated measurement position, wherein the estimated accuracy is derived from the first sensor data;

training the machine learning model to convert the first sensor data to a position in the environment, wherein the training is based on the samples of the estimation labeled type in the training dataset, whereby the machine learning model for positioning within the environment is created;

augmenting one or more samples of the estimation labeled type, wherein the augmenting comprises:

introducing noise to the first sensor data of the one or more samples; or removing a part of the first sensor data of the one or more samples; or introducing a received signal strength (RSS) offset to the first sensor data of the one or more samples; and including one or more augmented samples in the training dataset before training the machine learning model.

11. A method for creating a machine learning model for positioning within an environment, the method comprising:

receiving a training dataset comprising samples of an estimation labeled type, each sample of the estimation labeled type being associated with a measurement position in the environment, each sample of the estimation labeled type comprising:

first sensor data measured at the measurement position associated with the sample, the first sensor data being characteristic of the measurement position associated with the sample;

an estimated measurement position, being an estimate of the measurement position associated with the sample, wherein the estimated measurement position is derived from the first sensor data; and an estimated accuracy being an estimate of an accuracy of the estimated measurement position, wherein the estimated accuracy is derived from the first sensor data;

wherein the training dataset further comprises samples of an unlabeled type, each sample of the unlabeled type being associated with an unknown measurement position in the environment, each sample of the unlabeled type comprising:

second sensor data, measured at the unknown measurement position associated with the sample, the second sensor data being characteristic of the unknown measurement position associated with the sample; and training the machine learning model to convert the first sensor data to a position in the environment, wherein the training is based on the samples of the estimation labeled type in the training dataset and on the second sensor data of samples of the unlabeled type in the training dataset, whereby the machine learning model for positioning within the environment is created.

* * * * *